United States Patent
Egan et al.

(10) Patent No.: US 9,648,450 B2
(45) Date of Patent: May 9, 2017

(54) ASSISTANCE TECHNIQUES

(71) Applicant: NCR Corporation, Duluth, GA (US)

(72) Inventors: Gregory S. Egan, Flowery Branch, GA (US); Gregory Sirmans, Cumming, GA (US); Matthew Kamp, Cumming, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/338,981

(22) Filed: Jul. 23, 2014

(65) Prior Publication Data

US 2016/0029157 A1 Jan. 28, 2016

(51) Int. Cl.
*H04W 24/00* (2009.01)
*H04W 4/02* (2009.01)

(52) U.S. Cl.
CPC ..................................... *H04W 4/02* (2013.01)

(58) Field of Classification Search
None
See application file for complete search history.

(56) References Cited

U.S. PATENT DOCUMENTS

| | | | |
|---|---|---|---|
| 2004/0199426 A1* | 10/2004 | Prorock | 705/16 |
| 2013/0006789 A1* | 1/2013 | Fulkerson | 705/26.1 |
| 2013/0083915 A1* | 4/2013 | Flockhart | H04M 3/5233 379/265.11 |
| 2013/0198039 A1* | 8/2013 | Sridharan et al. | 705/26.44 |
| 2014/0129951 A1* | 5/2014 | Amin et al. | 715/738 |
| 2015/0079942 A1* | 3/2015 | Kostka et al. | 455/411 |
| 2015/0199732 A1* | 7/2015 | Vernick | 455/414.1 |
| 2015/0302417 A1* | 10/2015 | DeCelles | H04W 4/12 705/304 |

* cited by examiner

*Primary Examiner* — Erika Washington
(74) *Attorney, Agent, or Firm* — Schwegman, Lundberg & Woessner

(57) ABSTRACT

Assistance techniques that give customers more knowledge and more freedom to seek out employees or other help providers. In an example method, a mobile device of a customer sends a request for assistance to a host computer, receives a location of help provider from the host computer, and displays the location on a map. The customer may then seek out the help provider.

17 Claims, 2 Drawing Sheets

ASSISTANCE TECHNIQUES

BACKGROUND

This present invention relates to customer service and more specifically to assistance techniques.

Some establishments install systems that allow customers to summon help. These systems are based upon the establishment identifying where the customers are located and dispatching employees to assist customers at customer locations.

For example, some establishments may install indoor positioning systems (IPS). An IPS is designed to take advantage of customer use of Bluetooth Low Energy (BLE) equipped smartphone to locate a customer.

In one example IPS, a customer smartphone pulls data from BLE beacons positioned throughout an establishment. In another example IPS, BLE beacons pull data from the customer smartphone. In either case, the customer uses application software provided by the establishment to request assistance so that an employee can be dispatched to the customer's location.

One drawback with these systems is that a customer is required to wait at a current location for an employee, without any idea when or whether the employee will show up.

Therefore, it would be desirable to provide assistance techniques that give customers more knowledge and more freedom to seek out employees.

SUMMARY

In accordance with the teachings of the present invention, assistance techniques are provided.

An example method of providing information about help providers includes sending a request for assistance to a host computer by a mobile device, receiving a location of a help provider from the host computer by the mobile device, and displaying the location of the help provider on a map by the mobile device.

The example method may further include sending a location of the mobile device with the request.

The example method may include determining the location of the mobile device relative to beacons from the signal strengths of signals from the beacons, and determining the location of the mobile device relative to the map based upon map coordinates of the beacons.

The example method may further include displaying information about the one help provider.

Another example method of providing information about help providers includes receiving a request for assistance from a customer mobile device by a computer, receiving a location of a help provider mobile device from the help provider mobile device by the computer, and sending the location of the help provider mobile device to the customer mobile device by the computer.

The other example method may further include receiving a location of the customer mobile device from the customer mobile device.

The other example method may further include sending information about the help provider to the customer mobile device.

With any example, various options for selecting help providers are envisioned. For example, the help provider may be located within a predetermined distance of the location of the mobile device. As another example, the help provider is one suited to provide assistance. As another example, the help provider is based upon a user selection or other user-entered information. With any of the above examples, the help provider may be taken from a list of available help providers.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
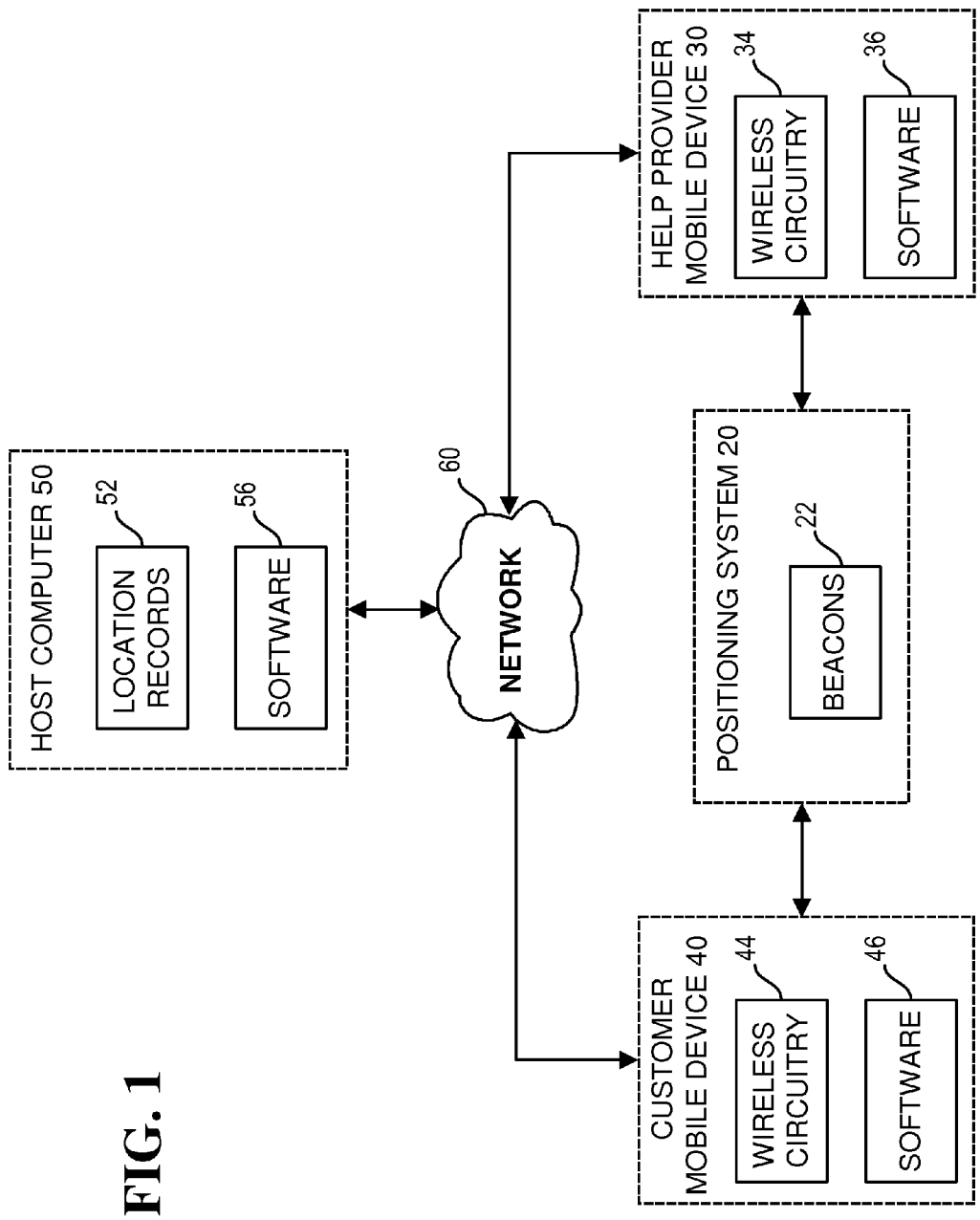
FIG. 1 is a block diagram of an example system.

With reference to FIG. 1, example positioning system 20 is of the type that sends data, though other example positioning systems 20 that pull data are also envisioned.

Example positioning system 20 includes beacons 22, which may include Bluetooth Low Energy (BLE) standard beacons. Beacons 22 transmit wireless signals, which may include 2.4 GHz signals. Other types of wireless beacons are also envisioned. The signals may include information, such as identifiers associated with beacons 20.

An employee or other help provider is equipped with a mobile device 30, which may include a portable terminal, a smart phone, personal digital assistant, or other portable communication device. Mobile device 30 may include wireless circuitry 34 for communicating with beacons 22. Mobile device 30 includes one or more processors, memory, and program and data storage. Mobile device 30 may execute an operating system such as a Microsoft, Apple, Google, or other operating system.

Mobile device 30 may execute other computer software, which may be stored in a computer readable medium. For example, mobile device 30 may execute software 36, which provides the location of mobile device 30 to host computer 50. Software 36 may have other functions and features tailored to the needs of the establishment. Software 36 may include a software applet written to be executed within the operating system of mobile device 30.

In one example, software 36 also sends a unique identifier to host computer 50.

In one example, software 36 is pre-programmed with information about positioning system 20, such as the identifiers of beacons 22 and the locations of beacons 22 relative to each other and to a map of the establishment.

In one example, mobile device 30 may obtain beacon identifiers and determine signal strengths associated with signals received from beacons 22, determine the location of mobile device 30 and the help provider based upon the signals that wireless circuitry 34 receives from beacons 22, and send the location information and an identifier identifying the help provider and/or mobile device 30 to host computer 50 through network 60.

Host computer 50 executes software 56 which receives location information from mobile devices 30, receives requests for assistance from mobile devices 40, and sends help provider location information to mobile devices 40. Software 56 maintains locations of mobile devices 30 in location records 52. Software 56 may also maintain locations of mobile devices 40 in location records 52. Software 56 may periodically or continuously update location records 52 with positions of mobile devices 30 and mobile devices 40 as customers and help providers move about the establishment.

In one example, software 56 may respond with locations of help providers within a predetermined distance of mobile device 40.

In one example, software 56 may respond with the locations of help providers best suited to provide assistance.

In one example, host computer may determine the help providers based upon inputs or selections entered by the customer using software 46.

In one example, software 56 can be configured to avoid reporting positions of employees who are on break or leaving work. For example, software 56 may access employee work schedules. As another example, software 56 may receive indications from employees through mobile devices 30 that they are working and available or that they are off work or on break and unavailable.

A customer is equipped with a mobile device 40, which may include a smart phone, personal digital assistant, or other portable communication device. Mobile device 40 may include wireless circuitry 44 for communicating with beacons 22. Mobile device 40 includes one or more processors, memory, and program and data storage. Mobile device 40 may execute an operating system such as a Microsoft, Apple, Google, or other operating system.

Mobile device 40 may execute other computer software, which may be stored in a computer readable medium. Software 46 assists the customer with locating help providers by obtaining locations of help providers with mobile devices 30 from location records 52. For this purpose, software 46 may display a map of the establishment indicating locations of help providers obtained from host computer 50. Software 46 may have other functions and features tailored to the needs of the establishment. Software 46 may include a software applet written to be executed within the operating system of mobile device 40.

In one example, software 46 provides the location of mobile device 40 to host computer 50.

In one example, software 46 also sends a unique identifier to host computer 50.

In one example, software 46 is pre-programmed with information about positioning system 20, such as the identifiers of beacons 22 and the locations of beacons 22 relative to each other and to a map of the establishment.

In one example, mobile device 40 may obtain beacon identifiers and determine signal strengths associated with signals received from beacons 22, determine the location of mobile device 40 and the customer based upon the signals that wireless circuitry 44 receives from beacons 22, and send the location information and an identifier identifying the customer and/or mobile device 40 to host computer 50 through network 60.

Network 60 may include any combination of wired or wireless networks, including local area, wide area, virtual private, and global communication networks, such as the Internet.

In one example, software 56 receives help provider and/or customer location information through a wireless network (Wi-Fi) connection with the establishment's local area network.

In another example, software 56 receives help provider and/or customer location information through a cellular network connection and the Internet.

Figure 2:
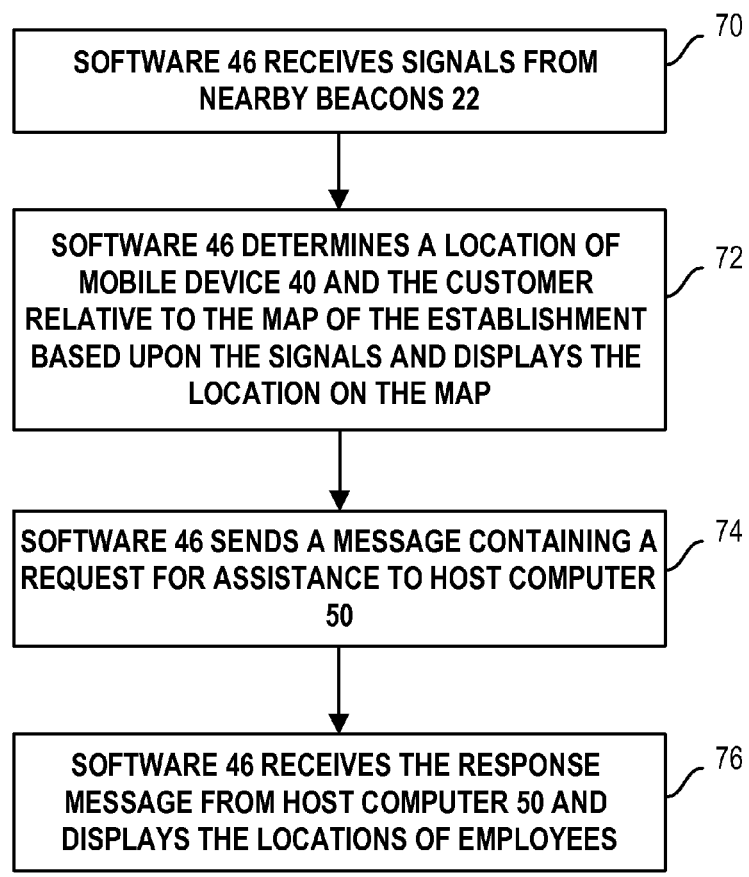
FIG. 2 illustrates an example method.

Referring now to FIG. 2, an example method is illustrated in which a customer with a mobile device 40 equipped with software 46 wants assistance. The customer executes software 46 to find a help provider.

In one example, software 46 displays a map of the establishment during execution. Software 46 is configured with corresponding information about the locations of beacons 22.

In step 70, software 46 receives signals from nearby beacons 22.

In step 72, software 46 determines a location of mobile device 40 and the customer relative to the map of the establishment based upon the signals and displays the location on the map.

In one example, software 46 determines distances from each of beacons 22 based upon signal strengths. Software 46 then determines a location relative to beacons 22 from the signal strengths of the signals. Software 46 may employ triangulation and/or other location determining techniques to pinpoint the location. For example, software 46 may calculate circles with radii equaling the distances from beacons 22 and determine at what point the circles all overlap. If wireless circuitry 44 and beacons 22 are BLE standard devices, the signal strengths can be very granular and result in accurate distance measurements.

In one example, software 46 obtains beacon identifiers from the signals. Software 46 then determines corresponding map locations for beacons 22 based upon the beacon identifiers. Software 46 may or may not display the beacons on the map.

In step 74, software 46 sends a message containing a request for assistance to host computer 50 through network 60.

In one example, software 46 also sends the location of mobile device 40 with the request.

In one example, software 46 may also send a unique identifier.

In one example, software 46 may provide predetermined help selections for a customer to choose from. The customer enters a choice for one of the help selections and the choice is sent to host computer 50 as part of the request.

Host computer 50 sends a response message with locations of help providers with mobile devices 30 from location records 52.

In one example, host computer 50 may respond with locations of help providers within a predetermined distance of mobile device 40.

In another example, host computer 50 may respond with the locations of help providers best suited to provide assistance.

For example, host computer 50 may determine using map information that the location of mobile device 40 is in a plumbing aisle of a home improvement store and respond by providing the location of a plumbing expert in a nearby aisle. Host computer 50 may send additional information about the help providers, such as their functions or expertise.

In one example, host computer may determine the help providers based upon inputs or selections entered by the customer using software 46.

In one example, software 56 can be configured to avoid reporting positions of employees who are not available, e.g., on break or leaving work. For example, software 56 may access employee work schedules. As another example, software 56 may receive indications from employees through mobile devices 30 that they are working and available or that they are off work or on break and unavailable.

In step 76, software 46 receives the response message from host computer 50 and displays the locations of help providers.

In one example, software 46 displays additional information about the help providers. For example, software 46 may display the help provider's name, position, and/or expertise.

Software 46 may periodically or continuously update positions of mobile device 40 and help providers as the customer moves about the establishment.

After receiving the locations of help providers on the map, the customer may proceed to a help provider to get assistance, rather than wait for a help provider.

The method of FIG. 2 may be combined with methods of locating customers by help providers. For this purpose, software 56 may send requests for customer assistance and customer location information to mobile device 30. Software 36 may display a map of the establishment indicating locations of customers obtained from host computer 50. A help provider may seek out customers in response to help requests.

Although the present invention has been described with particular reference to certain preferred embodiments thereof, variations and modifications of the present invention can be effected within the spirit and scope of the following claims.

What is claimed is:

1. A method of providing information about help providers comprising:
   sending a request for assistance to a host computer by a mobile device;
   receiving a location of a help provider from the host computer by the mobile device;
   displaying the location of the help provider on a map by the mobile device by identifying the help provider from a list of available providers and excluding and avoiding presentation and communication of any providers from the list that are presently on breaks from work by accessing work schedules of the providers, and receiving indications from at least some of the providers indicating that those providers are available, off work, or on the breaks, and wherein displaying further includes displaying beacon locations for beacons that resolve the location of the help provider on the map; and
   receiving signals from a plurality of the beacons by the mobile device;
   determining a location of the mobile device based upon the signals, and wherein determining further includes determining signal strengths of the signals, determining distances from each of the beacons based upon the signal strengths; and determining the location of the mobile device based upon the distances by calculating circles with radii equaling distances for the mobile device from the beacons and determining a point where the circles overlap as the location of the mobile device; and
   displaying the location of the mobile device on the map, and wherein displaying further includes obtaining beacon identifiers from the signals, determining beacon map coordinates, and
   displaying the location of the mobile device relative to the beacon coordinates.

2. The method of claim 1, wherein sending comprises sending a unique identifier of the mobile device with the request.

3. The method of claim 1, further comprising:
   displaying help selections by the mobile device; and
   recording entry of one of the help selections by the mobile device;
   wherein sending comprises sending the one help selection with the request.

4. The method of claim 3, wherein the help provider is based upon the one help selection.

5. The method of claim 3, wherein the help provider is taken from the list of available providers.

6. The method of claim 1, wherein sending comprises sending a location of the mobile device with the request.

7. The method of claim 6, further comprising:
   receiving other signals from another plurality of beacons by the mobile device;
   determining another location of the mobile device based upon the other signals; and
   displaying the other location of the mobile device on the map.

8. The method of claim 1, wherein the help provider is located within a predetermined distance of the location of the mobile device.

9. The method of claim 1, wherein the help provider is one suited to provide assistance.

10. The method of claim 1, further comprising displaying information about the one help provider.

11. A method of providing information about help providers comprising:
    receiving signals from a plurality of beacons by a mobile device, wherein the signals include beacons identifiers;
    determining a location of the mobile device relative to the beacons based upon strengths of the signals by the mobile device by calculating circles with radii equaling distances of the mobile device from the beacons and determining a point where the circles overlap as the location of the mobile device;
    determining map coordinates associated with the beacons based upon the beacon identifiers by the mobile device; and
    determining the location of the mobile device relative to the coordinates;
    sending a request for assistance to a host computer by a mobile device, wherein the request includes the location of the mobile device;
    receiving a location of an available help provider within a predetermine distance of the mobile device from the host computer by the mobile device based on accessing schedules of available providers and excluding and avoiding presentation and communication of any provider on a break from work, and receiving indications from at least some of the providers indicating that those providers are available, off work, or on the break; and
    displaying a map showing the location of the mobile device and the location of the help provider by the mobile device, and wherein displaying further includes displaying beacon locations for the beacons on the map.

12. A method of providing information about help providers comprising:
    receiving a request for assistance from a customer mobile device by a computer and determining a location of the customer mobile device by calculating circles with radii equaling distances of the customer mobile device from beacons in communication with the customer mobile device and determining a point where the circles overlap as the location of the mobile device;
    receiving a location of a help provider mobile device from the help provider mobile device by the computer and selecting the help provider by excluding any help provider identified as being on a break from work and receiving indications from at least some of the help providers indicating that those help providers are available, off work, or on the breaks; and sending the location of the help provider mobile device to the customer mobile device by the computer.

13. The method of claim 12, wherein the location of the help provider mobile device is within a predetermined distance of the location of the customer mobile device.

14. The method of claim 12, wherein the help provider is one suited to provide assistance.

15. The method of claim 12, wherein the help provider is one taken from a list of available help providers.

16. The method of claim 12, wherein the request comprises information about the request.

17. The method of claim 12, further comprising sending information about the one help provider to the customer mobile device.

* * * * *